United States Patent [19]

Michael et al.

[11] 4,413,715
[45] Nov. 8, 1983

[54] SELF-ENERGIZED SYNCHRONIZER

[75] Inventors: Richard A. Michael, Waterloo; Dalsang K. Chaudhari, Cedar Falls; Gordon L. Marquart, Jesup, all of Iowa

[73] Assignee: Deere & Company, Moline, Ill.

[21] Appl. No.: 321,139

[22] Filed: Nov. 13, 1981

[51] Int. Cl.³ ............................................. F16D 23/06
[52] U.S. Cl. ..................................... 192/53 F; 192/54
[58] Field of Search ................... 192/53 F, 54; 74/339

[56] References Cited

U.S. PATENT DOCUMENTS

| | | | |
|---|---|---|---|
| 2,745,529 | 5/1956 | Dorpmund | 192/53 |
| 2,941,641 | 9/1956 | Stump | 192/53 |
| 3,286,801 | 7/1964 | Wojcikowski | 192/53 |
| 3,703,226 | 11/1972 | Strehler et al. | 192/54 X |
| 3,856,121 | 12/1974 | Usui et al. | 192/53 F X |
| 4,185,725 | 1/1980 | Maina | 192/53 F |

FOREIGN PATENT DOCUMENTS

| | | | |
|---|---|---|---|
| 1170795 | 5/1964 | Fed. Rep. of Germany | 192/53 F |
| 1910884 | 9/1970 | Fed. Rep. of Germany | 192/53 F |
| 1755457 | 6/1971 | Fed. Rep. of Germany | . |
| 2538781 | 3/1977 | Fed. Rep. of Germany | 74/339 |

Primary Examiner—Rodney H. Bonck
Assistant Examiner—David D. House

[57] ABSTRACT

An improved self-energized synchronizer for bringing two rotatable members which are aligned about a common axis into synchronization. The synchronizer includes a body member carried on the first rotatable member which in turn engages with an annular shifter collar. Positioned adjacent to the shifter collar is an axially movable annular blocking ring having a frictional surface. Situated on the other side of the blocking ring, opposite the body member, is a drive collar which is rotatably fixed to the second rotatable member. The improvement to the synchronizer includes a frictional disk and a self-energized mechanism for transferring frictional torque between the first and second rotatable members. The self-energized mechanism is positioned for engagement with the blocking ring, while the frictional disk is positioned between the drive collar and the self-energized mechanism. As the operator axially moves the shifter collar, the blocking ring is brought into contact with the self-energized mechanism, and a portion of the mechanism is axially forced into contact with the frictional disk. This contact causes the frictional disk to assist in decreasing the relative rotation between the first and second rotatable members once the self-energized mechanism frictionally engages the blocking ring.

21 Claims, 13 Drawing Figures

SELF-ENERGIZED SYNCHRONIZER

FIELD OF THE INVENTION

This invention relates to an improved self-energized synchronizer for use in transmissions for motorized vehicles and more particularly to an improved self-energized synchronizer for use in transmissions for off-road type vehicles having increased torque and energy capacity.

BACKGROUND OF THE INVENTION

Synchronizers are devices used in transmissions of motorized vehicles to facilitate the clash-free shifting of gears. On off-road type vehicles, such as agricultural and industrial equipment, the synchronizers are of a heavier construction in order to overcome the higher inertia forces of the transmission gears and traction clutch. With the increase in the overall size and weight of such equipment, there has been a demand to provide a more responsive synchronizer, one that has an increased energy capacity without further increasing its size.

Initial attempts to satisfy the industry demands have resulted in the production of synchronizers having a larger surface area. The larger surface area did increase the energy capacity of the synchronizers but also created increased bulk that caused assembly problems due to the space limitation of the transmission itself. Subsequent solutions attempted to retain the large frictional contact area while reducing the overall size of the synchronizer. Two such devices are taught in U.S. Pat. No. 3,286,801, issued to M. J. Maina in November, 1966 and U.S. Pat. No. 4,185,725, issued to R. J. Wojcikowski in January 1980. The Maina patent taught the use of primary and intermediate synchronizer elements to increase drag torque while the Wojcikowski patent utilized multiple cone shaped frictional surfaces. A third solution to the problem was taught in West German Pat. No. 1,755,457 which issued to M. Merjerle in March, 1971. This patent used self-energized balls retained in ramp recesses to provide axial movement between two of the synchronizer components to increase the synchronizer torque. None of these designs totally solved the industry problem.

Now an improved synchronizer has been invented for use in transmissions for motorized vehicles which is more responsive to shift demands.

SUMMARY OF THE INVENTION

Briefly, this invention relates to an improved self-energized synchronizer for synchronizing two members which are rotatable about a common axis. The synchronizer includes an annular body member carried on the first rotatable member which in turn engages with an annular shifter collar. Positioned adjacent to the shifter collar is an annular blocking ring having means for assisting in limiting the relative rotation between the two members. Situated on the other side of the blocking ring is a drive collar which is fixed to the second rotatable member for rotation therewith. A cone element is also present, which is rotatable with the drive collar, having a conical outer frictional surface which is engageable with a mating surface on the blocking ring. As the blocking ring is axially moved into contact with the cone element, a frictional union results which causes the first and second rotating members to turn at the same speed. The improvement to the synchronizer includes an annular clutch disk carried on the body member which acts between the drive collar and a rotatable plate member positioned adjacent to the cone element. The plate member is normally in simultaneous rotation with the cone element and is axially forced into contact with the clutch disk when the rates of rotation of the plate member and the cone element become unequal due to the frictional engagement between the blocking ring and the cone element which are operating at different rates of rotation. The frictional contact of the plate member with the clutch disk assist in decreasing the relative rotation between the first and second rotatable members once the cone element frictionally engages the blocking ring.

This improved design not only increases the energy capacity of the synchronizer but also divides the torque transfer between the first and second rotatable members into two separate and distinct paths. One path is formed from the drive collar through the plate member, cone element, blocking ring and annular body member to the first rotatable member. The second path is formed from the drive collar through the plate member, clutch disk and annular body member to the first rotatable member.

The general object of this invention is to provide an improved self-energized synchronizer which provides increased torque and energy capacity over conventional synchronizers. A more specific object of this invention is to provide an improved self-energized synchronizer having a frictionally engaging cone element and a frictionally engaging clutch disk for providing more responsive synchronization between two rotatable members.

Another object of this invention is to provide an improved self-energized synchronizer having two separate and distinct torque transfer paths between two rotatable members.

Still another object of this invention is to provide an improved self-energized synchronizer for off-road type vehicles which is more responsive to shift demands.

Other objects and advantages of the present invention will become more apparent to those skilled in the art in view of the following description and the drawings.

DETAILED DESCRIPTION OF THE PREFERRED EMBODIMENT

Figure 1:
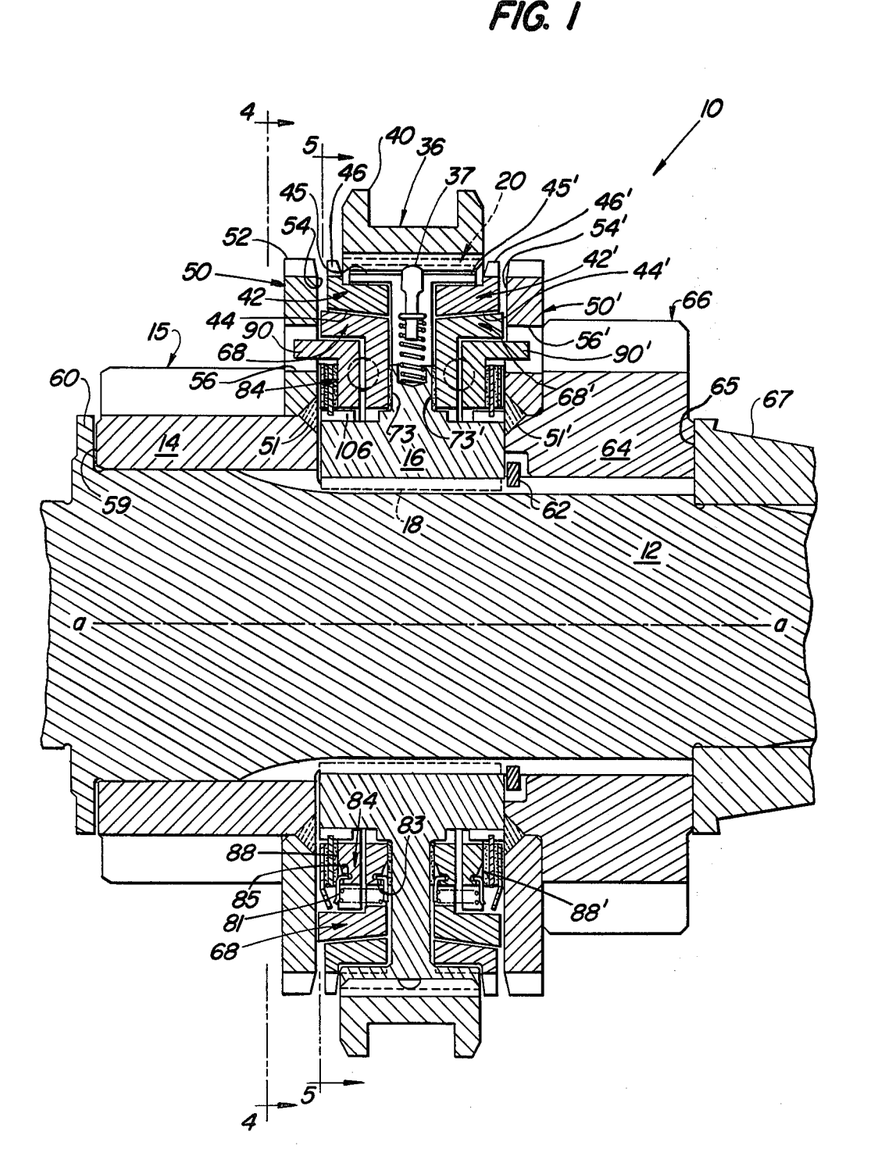
FIG. 1 is a sectional view of an improved self-energized synchronizer taken along the line 1—1 of FIGS. 4 and 5.
Figure 2:
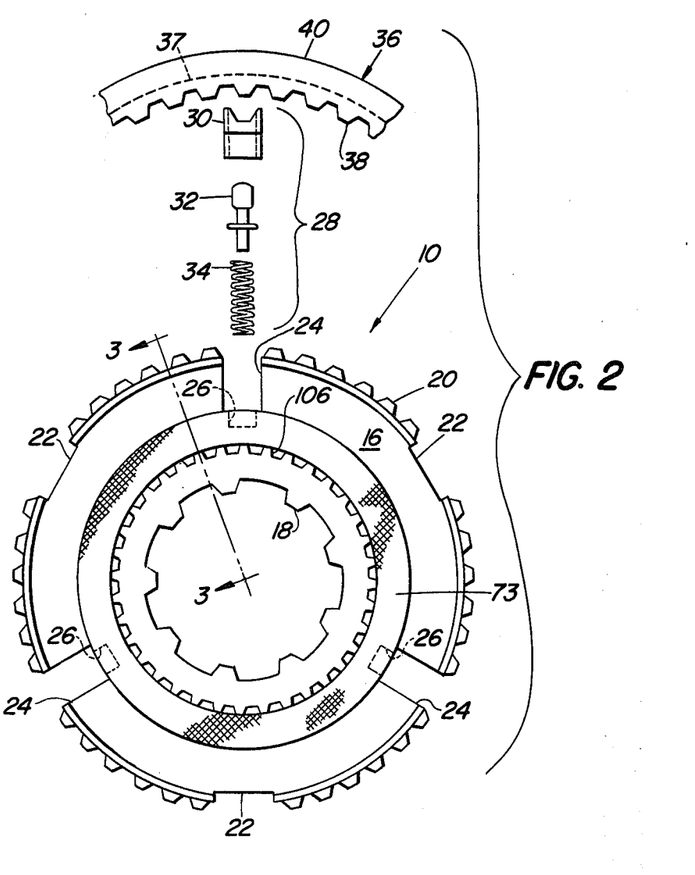
FIG. 2 is a reduced scale, partial exploded view of one of the detent mechanisms showing its arrangement between the body member and the shifter collar.

Referring to FIG. 1, an improved self-energized synchronizer 10 is shown for synchronizing two members 12 and 14 or 12 and 64 which are rotatable about a common axis (a—a). Such synchronizers are normally utilized in the transmissions of motorized vehicles for facilitating the clash-free shifting of gears. The synchronizer 10 includes a body member 16 which is carried on the first member 12 and is caused to rotate therewith by a spline attachment 18. The body member 16, best shown in FIG. 2, contains a toothed outer circumference 20 and two sets of equally spaced notches thereon, 22 and 24 respectively. The first set of notches 22 are shallow notches which extend completely across the width of the body member 16. Preferably, there are at least three such notches 22 and their specific function will be explained shortly. The second set of notches 24, of which there are also at least three, are formed intermediate to the first set of notches 22 and have a much deeper configuration. The second set of notches 24 also extend completely across the width of the body member 16.

A bore 26 is formed in the base of each of the notches 24 which provides support for a detent mechanism 28. Each of the detent mechanisms 28 includes a guide 30, a plunger 32 and a spring 34. The detent mechanisms 28 extend outward from the body member 16 and abut against a shifter collar 36 having a toothed inner circumferential surface 38 which engages with the toothed outer circumference 20 of the body member 16. In this normal intermeshing position, the plungers 32 of the detent mechanisms 28 engage an annular groove 37, see FIG. 3, which is formed in the inner surface 38 of the shifter collar 36. The plungers 32 are held in the groove 37 both by the guides 30 and by the force of the springs 34 biasing the plungers 32 outward.

The shifter collar 36 also contains an outer circular surface 40 which is configured to receive a conventional shifter fork (not shown) which manipulates the axial movement of the shifter collar 36 via a manual lever located in the operator station of the vehicle. The connection of the manual lever to the shifter fork and its cooperation with the shifter collar 36 are well known to those skilled in the transmission art and therefore will not be explained.

Figure 6:
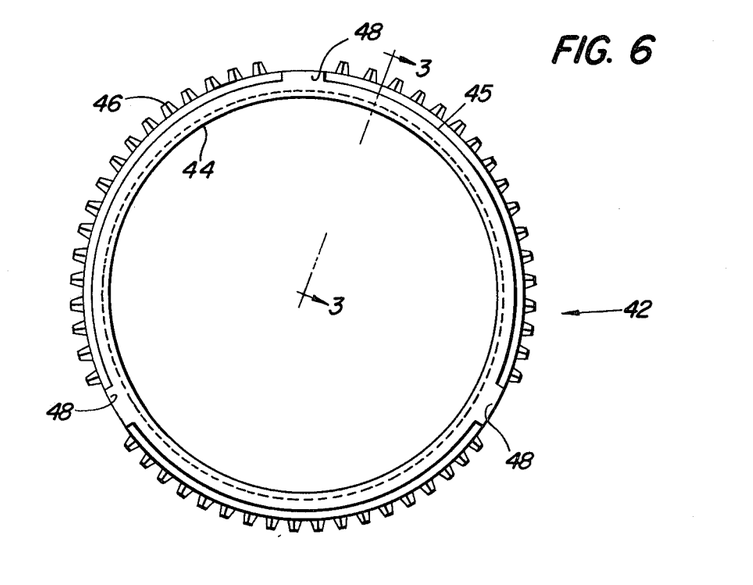
FIG. 6 is a right end view of the blocking ring shown in FIG. 3.

Referring again to FIG. 1, on each side of the body member 16 is a blocking ring 42 and 42'. As used therein, the elements to the left of the body member 16, as viewed in FIG. 1, are referred to by whole numbers and similar elements to the right of the body member 16 are denoted by primed numbers of the same value. Each of the blocking rings 42 and 42', best seen in FIGS. 3 and 6, has a conical inner surface 44 and 44' which is a frictional surface inclined radially inwardly toward the body member 16. Preferably, the incline is from about 5-10 degrees and most preferably about 6.5 degrees when measured from the central axis of said first member. Formed on a circular outer surface 45 and 45' are bevelled teeth 46 and 46' which have an outer diameter which is approximately equal to the diameter of the inner circumferential surface 38 of the shifter collar 36. This similarity in size permits the teeth on the shifter collar 36 to mesh with the teeth on either of the blocking rings 42 or 42' as the shifter collar 36 is axially moved over the respective blocking ring. Formed between the inner and outer surfaces, 44 and 45 or 44' and 45' respectively, are abutments 48 and 48' which extend into and cooperate with the notches 22 to limit relative movement between the body member 16 and the blocking rings 42 and 42'. Preferably, each blocking ring 42 and 42' will contain a number of abutments 48 and 48' corresponding to the number of notches 22 formed in the body member 16.

Figure 3:
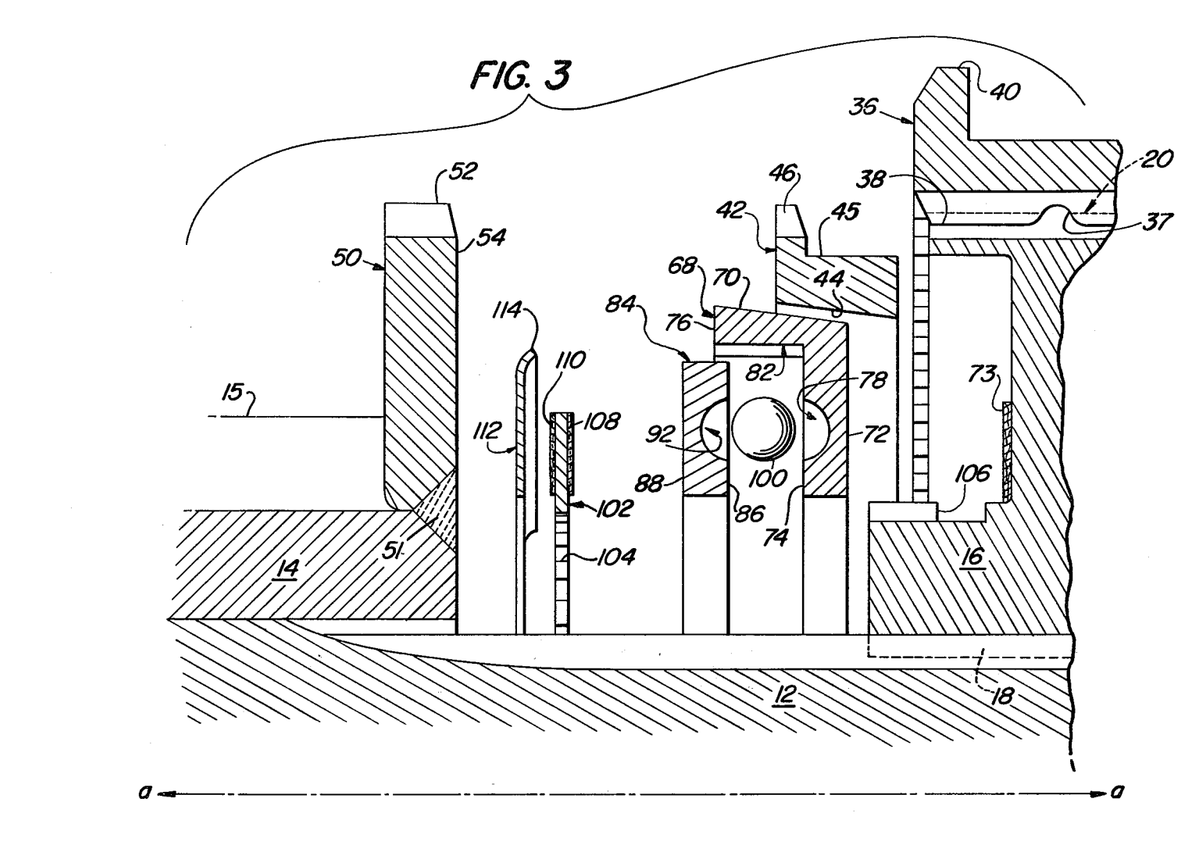
FIG. 3 is a partially exploded assembly view of a portion of the synchronizer taken along the lines 3—3 of FIGS. 2, 4–7, 9, 11 and 12.
Figure 4:
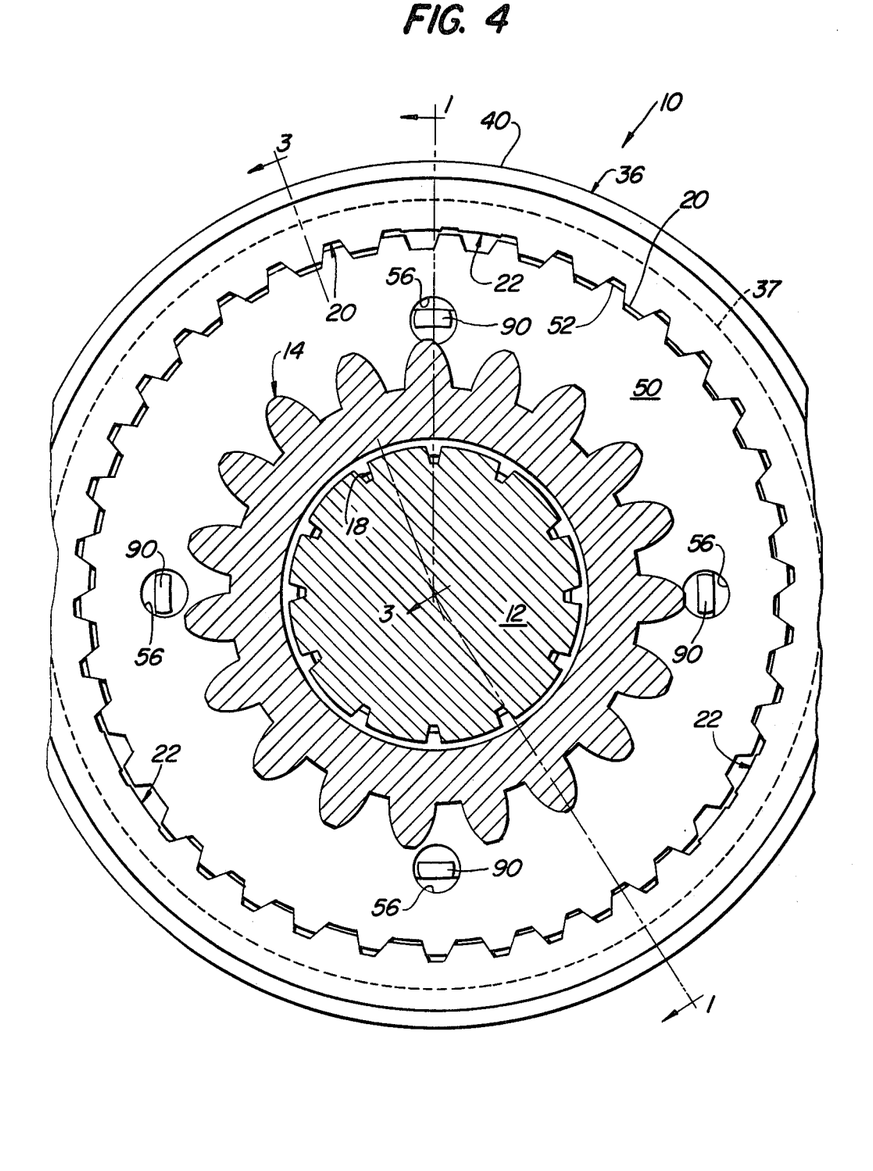
FIG. 4 is a left end view taken along the line 4—4 of FIG. 1.

Located to the side of the blocking rings 42 and 42', opposite from the body member 16, are drive collars 50 and 50', respectively. The drive collar 50, see FIGS. 1, 3 and 4, is secured to the second member 14 such as by a weld joint 51. The other drive collar 50' (see FIG. 1) is secured to a third rotatable member 64 in a similar fashion, such as by a weld joint 51'. The second and third rotary members 14 and 64 are gears having a toothed outer circumference 15 and 66 respectively, and are positioned on opposite sides of the body member 16. The drive collars 50 and 50' will rotate with the respective second or third members, 14 and 64, which are journaled onto the first member 12 and which can rotate independent of each other. The second member 14 is axially restrained on its left side 59 by a shoulder 60 and on its right side by the body member 16 which in turn is secured to the first member by a snap ring 62. The third rotary member 64 is axially held in position on its right side 65 by a retaining member 67 which is secured to the first member 12, such as by a press fit.

Referring again to FIGS. 1 and 3, the drive collar 50 has a toothed outer circumference 52 which is approximately of the same diameter as the diameter of the toothed inner surface 38 of the shifter collar 36. This similarity in size permits the teeth of the shifter collar 36 to mesh with the teeth of the drive collar 50 when the shifter collar 36 is axially moved across the blocking ring 42 and onto the drive collar 50. The drive collar 50 also contains a flat side surface 54 facing toward the body member 16 and has at least one orifice 56, see FIG. 1, extending into and more preferably through the drive collar 50. There are preferably four orifices 56 which are equally spaced about the side periphery of the drive collar 50 and their function will be explained shortly. The other drive collar 50' is identical to the drive collar 50 and therefore further explanation of it is unnecessary.

The self-energized synchronizer 10 also includes a cone element 68, a pressure plate 84, a frictional disk 102 and a separator plate 112 all sandwiched together on each side of the body member 16 between the respective blocking rings 42, 42' and the drive collars 50 and 50'. For the sake of simplicity, only the elements on the left side of the body member 16, see FIG. 3, will be discussed in detail. The cone element 68 is a hollow circular member coaxially arranged about the first member 12 with a conical outer surface 70, a first side surface 72 and step shaped second and third side surfaces 74 and 76, respectively. The cone element 68 is aligned with the blocking ring 42 such that the conical outer surface 70 is frictionally engageable with the conical inner surface 44 of the blocking ring 42. This frictional engagement occurs when the blocking ring 42 is axially moved to the cone element 68. The first side surface 72 of the cone element 68 is also capable of frictionally engaging a frictional surface 73 secured to a side of the body member 16. The frictional surface 73 can be any known material with a high coefficient of friction.

Figure 7:
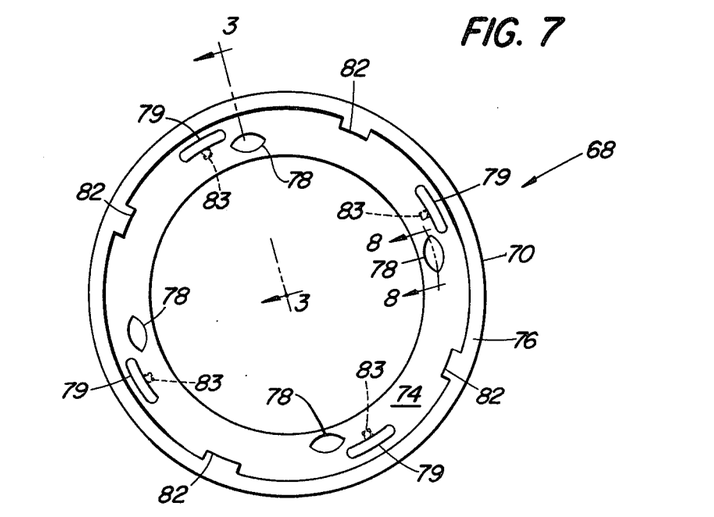
FIG. 7 is a left end view of the cone element shown in FIG. 3.
Figure 8:
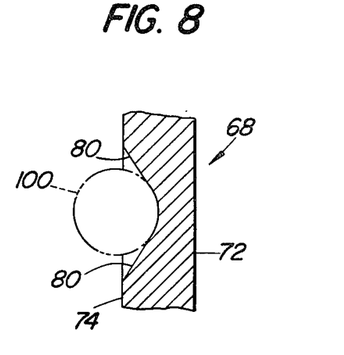
FIG. 8 is a cross-sectional view of one of the recesses formed in the cone element taken along the line 8—8 of FIG. 7.

Turning now to FIG. 7, a left end view of the cone element 68 is depicted showing a set of football shaped recesses 78 and a set of narrow, arcuately shaped slots 79 formed in the second side surface 74. There are at least three and preferably four such recesses and slots equally spaced about the second side surface 74. The football shaped recesses 78 have a longitudinal V-shaped cross section, see FIG. 8, with two ramped surfaces 80. The two ramped surfaces 80 are oppositely aligned and are inclined inward from the side surface 74 at about 10–45 degrees, preferably 20–40 degrees and most preferably about 35 degrees. As viewed from FIG. 3, the ramped surfaces 80 project into and out of the page and are in line with the rotational movement of the cone element 68. The use of two oppositely aligned ramped surfaces 80 allow the self-energized synchronizer 10 to operate regardless of whether the cone element 68 is rotated clockwise or counter-clockwise.

Figure 5:
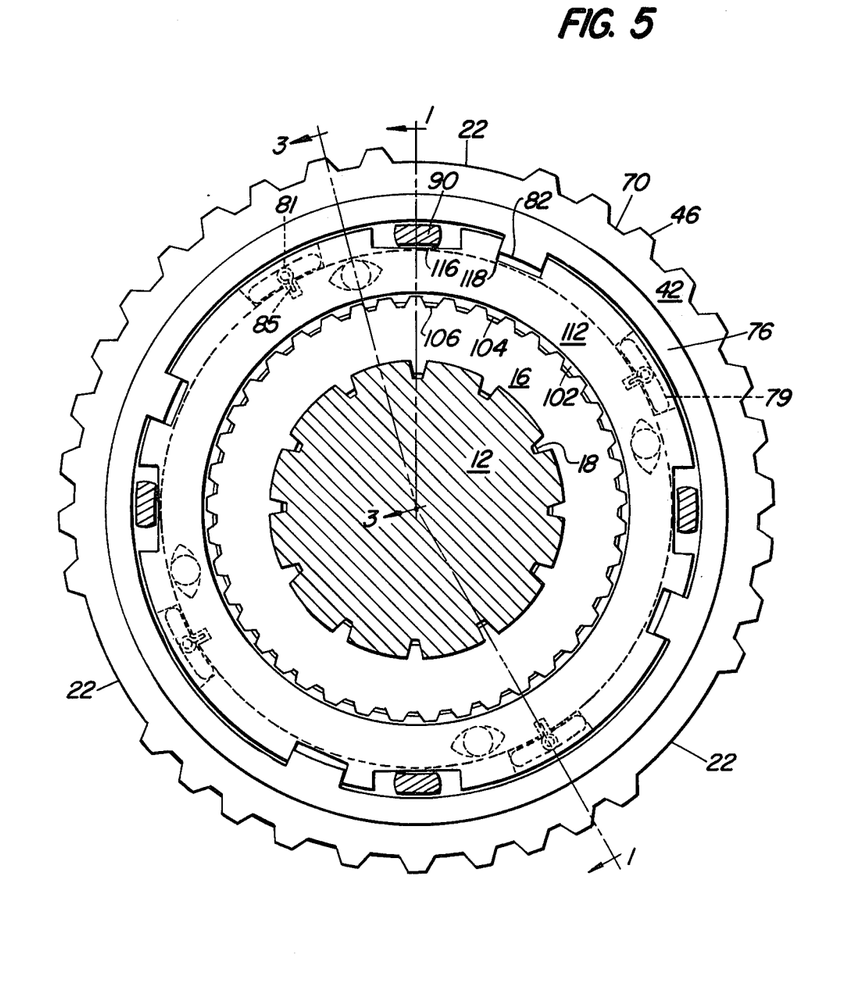
FIG. 5 is a left end view taken along the line 5—5 of FIG. 1 with the shifter collar omitted.

The set of narrow, arcuately shaped slots 79 are angularly offset from the recesses 78 and each slot functions to partially house a tension spring 81, see the bottom half of FIG. 1, attached between the cone element 68 and the adjacent pressure plate 84. One end of each of the tension springs 81, is anchored in a respective orifice 83 formed in the cone element 68 and the second end of each of the tension springs 81 is anchored in a respective orifice 85 formed in the pressure plate 84, shown in FIG. 5 and the lower portion of FIG. 1. The tension springs 81, of which there are preferably four, provide a force which constantly biases the two members 68 and 84 together.

The cone element 68 also contains at least three and preferably four abutments 82 formed between the step in the second and third side surfaces 74 and 76. The abutments 82 permit axial movement of the pressure plate 84 along the cone element 68.

Figure 9:
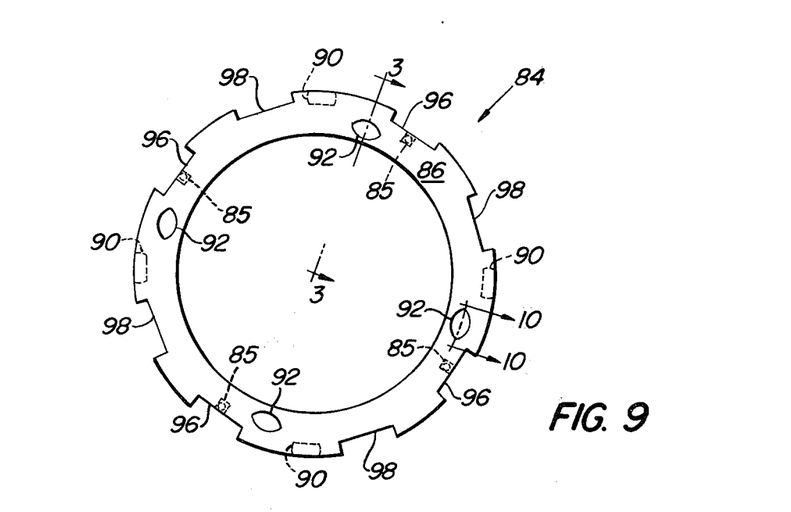
FIG. 9 is a right end view of the pressure plate shown in FIG. 3.

The pressure plate 84, shown in FIGS. 1, 3 and 9, is coaxially arranged about the first member 12 and is positioned adjacent to the second side surface 74 of the cone element 68. The pressure plate 84 contains first and second side surfaces 86 and 88, respectively, and has at least three, and preferably four equally spaced tab members 90. The tab members 90, as shown in FIG. 1, protrude outward away from the second side surface 88 and into the corresponding orifices 56 of the drive collar 50. The tab members 90 have a width approximately equal to the diameter of each of the orifices 56, see FIG. 4, and when the tab members 90 are inserted into the orifices 56, an attachment is formed which causes the pressure plate 84 to rotate in unison with the drive collar 50. The elongated tab members 90 also permit a relative amount of axial movement of the pressure plate 84 with respect to the drive collar 50.

Figure 10:
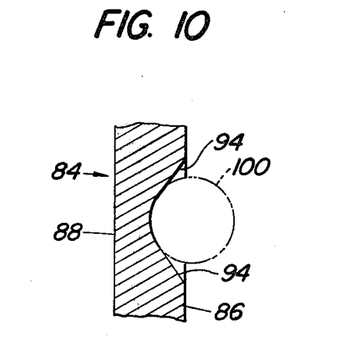
FIG. 10 is a cross-sectional view of one of the recesses formed in the pressure plate taken along the line 10—10 of FIG. 9.

Referring to FIG. 9, the first side surface 86 of the pressure plate 84 contains a set of football shaped recesses 92 which correspond to the number of recesses 78 formed in the cone element 68. The football shaped recesses 92, see FIG. 10, also have a similar V-shaped cross section as the recesses 78 with corresponding ramped surfaces 94 inclined inward from the first side surface 86 at about 10–45 degrees, preferably 20–40 degrees and most preferably about 35 degrees. Positioned between each pair of corresponding football shaped recesses 78 and 92 in the cone element 68 and pressure plate 84, respectively, is a roller 100, such as a ball. Each roller 100 has a diameter which is greater than twice the depth of either of the recesses 78 or 92. This dimensional feature of the rollers 100 prevents the first side surface 86 of the pressure plate 84 from contacting the second side surface 74 of the cone element 68, thereby limiting the inward axial movement therebetween. As a relative rotation develops between the cone element 68 and the pressure plate 84, the rollers 100 will be forced up oppositely aligned ramp surfaces 80 and 94 of the recesses 78 and 92 respectively, and will axially separate the cone element 68 from the pressure plate 84. This axial movement will also force the first side surface 72 of the cone element 68 into contact with the friction facing 73 of the body member 16. The ramp surfaces 80 and 94, which face in the rotational plane of travel of the respective members 68 and 84 permit the rollers 100 to axially separate the two members 68 and 84 regardless of whether the members 68 and 84 are rotated clockwise or counterclockwise. The action of the rollers 100 acting between the cone element 68 and the pressure plate 84 creates a self-energized mechanism which will be more fully explained in the section entitled "Operation".

Located on the outer circumference of the pressure plate 84 are first and second sets of notches 96 and 98, respectively. The first set of notches 96, of which there are at least three and preferably four, are equally spaced with respect to one another and are formed adjacent to the orifices 85 formed in the second side surface 88. The notches 96 correspond to the narrow, arcuately shaped slots 79 of the cone element 68 and partially house the tension springs 81. The ends of the tension springs 81 are secured in the corresponding pair of orifices 83 and 85 so that the axis of each spring 81 lies parallel to the axis of the first member 12 as shown in the bottom half of FIG. 1. The second set of notches 98, of which there are at least three and preferably four, receive the abutments 82 which are formed on the cone element 68. The clearance of the abutments 82 in the notches 98 permit the cone element 68 and the pressure plate 84 to move rotationally with respect to each other.

Figure 11:
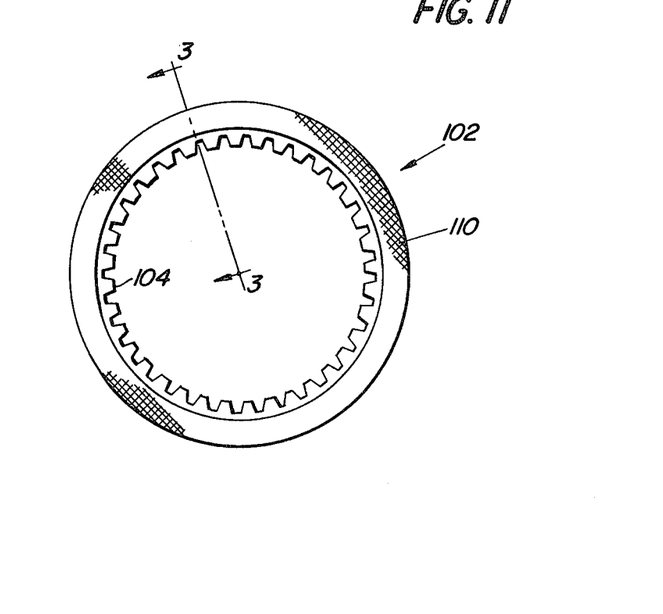
FIG. 11 is a left end view of the clutch disk shown in FIG. 3.
Figure 12:
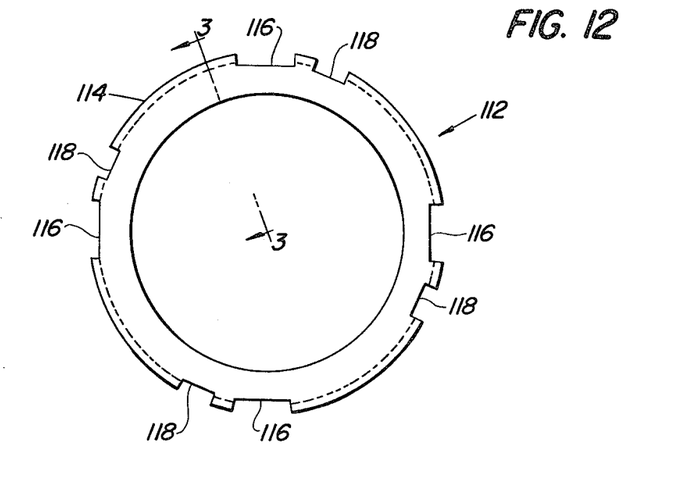
FIG. 12 is a left end view of the separator plate shown in FIG. 3.

Referring now to FIGS. 3 and 11, the frictional disk 102 of the self-energized synchronizer 10 is shown positioned adjacent to the second side surface 88 of the pressure plate 84. This frictional disk 102 is an annular shaped member coaxially arranged about the first member 12 having a splined inner circumferential surface 104. This splined surface 104 engages with a mating splined surface 106 which is part of the body member 16. The engagement of the inner circumferential surface 104 with the splined surface 106 causes the frictional disk 102 to rotate with the body member 16 at all times. The splined engagement also permits the frictional disk 102 to move axially with respect to the body member 16 such that contact can be made with adjacent elements.

Attached to the opposite sides of the frictional disk 102 are frictional liners 108 and 110. The frictional liner 108 is designed to contact the second side surface 88 of the pressure plate 84 as the two members 84 and 102 move axially toward each other. The frictional liner 110 is designed to contact the separator plate 112, which is positioned between the frictional disk 102 and the flat side surface 54 of the drive collar 50, when the two members 102 and 112 move axially toward each other.

The separator plate 112, see FIGS. 1, 3, 5 and 12, is a thin annularly shaped member coaxially arranged around the first member 12 and has a slightly curved outer circumference 114 having first and second sets of notches 116 and 118, respectively, formed therein. There are at least three notches and preferably four notches to each set. The first set of notches 116 provide an opening through which the tab members 90 of the pressure plate 84 can pass through so as to be able to protrude into the orifices 56 formed in the drive collar 50. The notches 116 are wider than the width of the tab members 90 so as to permit limited rotation of the pressure plate 84 as the rollers 100 ride up the ramped surfaces 80 and 94. The second set of notches 118 provide an opening for the abutments 82 of the cone element 68, see FIG. 5, so that when the self-energized synchronizer 10 is assembled, the outer circumference 114 of the separator plate 112 will be completely encircled by the cone element 68. Like a spline attachment, the abutments 82 will permit axial movement of the separator plate 112 with respect to the cone element 68 while forcing the separator plate 112 to rotate with the cone element 68. This enables the frictional forces developed from the contact between the separator plate 112 and the frictional disk 102 to be transferred directly into the cone element 68.

Figure 13:
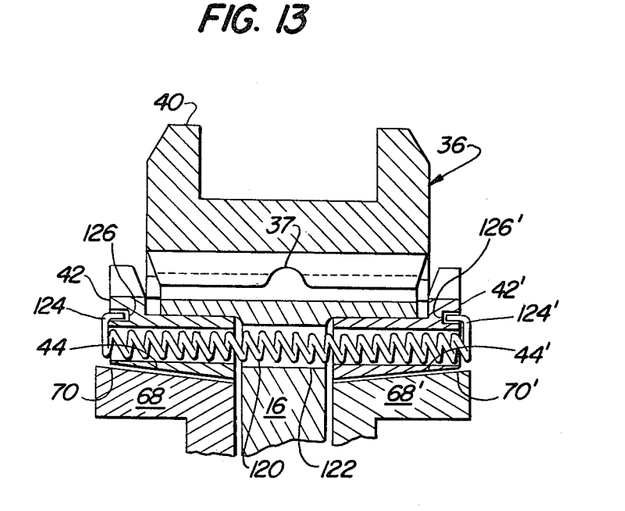
FIG. 13 is an enlarged sectional view of a portion of the improved self-energized synchronizer showing an optional tension spring attached between the two blocking rings for maintaining running clearances.

Referring now to FIG. 13, optional tension springs 120 can be connected between the pair of blocking rings 42 and 42'. The springs 120, of which there are three and preferably four, are equally spaced about the body member 16 and pass through a bore 122 coaxially aligned through the blocking rings 42 and 42' and the body member 16. The ends 124 and 124' of the spring 120 are retained in indentations 126 and 126', respectively, formed in the outward facing surfaces of the blocking rings 42 and 42'. The tension springs 120 function to limit the axial separation of the blocking rings 42 and 42' and therefore assist overcoming any frictional locking forces which may develop between the outer conical surfaces 70 and 70' of the cone elements 68 and 68' and the inner conical surfaces 44 and 44' of the blocking rings 42 and 42', respectively.

The interaction of the various parts of the self-energized synchronizer 10 will be discussed below.

OPERATION

Synchronization between the first and second members 12 and 14, respectively, will now be explained and the synchronization between the first and third members 12 and 64, respectively, will be identical except that the shifter collar 36 is axially moved toward the drive collar 50' instead of the drive collar 50.

Referring to FIGS. 1-5, the procedure of synchronization will be described starting with the shifter collar 36 in a neutral position wherein it is located directly over the body member 16, as shown in FIG. 1. The synchronization can occur regardless of the relative rotation of the first and second members 12 and 14, respectively.

Using FIGS. 1 and 3 as references, it will be readily apparent that the body member 16, the shifter collar 36, the blocking ring 42 and the frictional disk 102 will all be rotating at the same speed and in the same direction as the first member 12. This is because the body member 16 is attached by splines 18 to the first member 12, the shifter collar 36 has an inner toothed circumference 38 which mates with the outer toothed circumference 20 of the body member 12, the blocking ring 42 has abutments 48, see FIG. 6, that are retained in the notches 22 of the body member 16, and the frictional disk 102 is attached by the splines 106 to the body member 16. The remaining members, namely the cone element 68, the pressure plate 84, the separator plate 112 and the drive collar 50 will all be rotating at the same speed and in the same direction as the second member 14. This is because the drive collar 50 is permanently attached by weld 51 to the second member 14, the tabs 90 on the pressure plate 84 pass through the notches 116 on the separator plate 112 and engage with the openings 56 located in the drive collar 50, and the abutments 82 on the cone element 68 lies within the confines of the notches 98 and 118 of the pressure plate 84 and separator plate 112, respectively.

The synchronization process starts when the shifter collar 36 is moved from its neutral position towards the second member 14. The shifter collar 36 is mechanically connected to an operatable shift lever located in the cab of the vehicle. As the shifter collar 36 is moved leftward, the spring 34 of the detent mechanism 28, see FIG. 2, will bend to permit the top surface of the plunger 32 to remain in the circular groove 37 formed in the shifter collar 36. As the detent mechanism 28 pivots on the spring 34, the guides 30 are brought into contact with the right side of the blocking ring 42 and an axial force is exerted on the blocking ring 42. This axial force will move the blocking ring 42 a fraction of a millimeter and cause its inner conical surface 44 to frictionally engage the outer conical surface 70 of the cone element 68. As the frictional engagement is occurring, the teeth 46 of the blocking ring 42 will be rotated slightly, approximately half of the thickness of a tooth, such that the teeth 46 of the blocking ring 42 are out of alignment with the toothed inner circumference of the shifter collar 36. The limit of the out of phase movement is dictated by the amount of play the abutments 48 of the blocking ring 42 have in the notches 22 of the body member 16. This misalignment blocks the movement of the shifter collar 36 across the blocking ring 42 and onto the drive collar 50 until both the first and second members 12 and 14, respectively, are rotating at the same speed.

With the blocking ring 42 frictionally engaging the outer conical surface 70 of the cone element 68, a difference in rotational speed between the cone element 68 and the pressure plate 84 is developed. This speed difference forces the rollers 100 to roll up the inclined ramp surfaces 80 and 94 of the recesses 78 and 92 respectively, thereby axially separating the cone element 68 from the pressure plate 84. During this axial separation of a fraction of a millimeter, the first side surface 72 of the cone element 68 is pressed into frictional engagement with the frictional surface 73 of the body member 16. Simultaneously, the second side surface 88 of the pressure plate 84 is pressed into engagement with the frictional liner 108 of the friction disk 102. In turn, the frictional liner 110 on the other side surface of the friction disk 102 is brought into engagement with the separator plate 112. The separator plate 112 frictionally feeds the torque from the friction disk 102 back into the cone element 68 by the connection between the abutments 82 and the notches 118. The result is that the first member 12 experiences a drag force which causes it to slow down ever so slightly while the second member 14 experiences an input force which causes it to speed up until both members, 12 and 14, are rotating at the same speed.

The torque forces acting between the first and second members, 12 and 14, flow through three separate and distinct paths. The first path is formed from the drive collar 50 across the pressure plate 84, the cone element 68, the blocking ring 42 and the body member 16 to the first member 12. The second path is from the drive collar 50 via the pressure plate 84, the friction disk 102 and the body member 16 to the first member 12 and the third path is from the drive collar 50 across the pressure plate 84, the cone element 68, the frictional surface 73 and the body member 16 to the first member 12. The second and third paths are secondary paths while the first path is the primary path.

At the same time as the torque forces are being transmitted between the first and second members, 12 and 14, the slight amount of axial separation between the various members causes the left side 59 of the second member 14 to frictionally engage the shoulder 60, see FIG. 1. This frictional contact will assist in synchronization. With the first and second members 12 and 14, respectively, rotating at the same speed, and with the toothed inner circumference 38 of the shifter collar 36 contacting the beveled teeth 46 of the blocking ring 42, the blocking ring 42 will be brought back into alignment with the teeth 38 of the shifter collar 36. The shifter collar 36 can now be moved across the blocking ring 42 and be brought into engagement with the toothed outer circumference 52 of the drive collar 50. In this position, the shifter collar 36 bridges the body member 16 to the drive collar 50 and thereby mechanically connects the first and second members, 12 and 14, together.

The synchronization process between the first and third members 12 and 64, respectively, is exactly the same except the shifter collar 36 is moved to the right, as shown in FIG. 1, and a frictional force is developed between the right side 65 of the third member 64 and the retaining member 67.

In order to disconnect the synchronization between the first and second members 12 and 14, respectively, the operator will disengage the input power to the first member 12, such as through activation of a conventional clutch and will move the shifter collar 36 rightward, as viewed in FIG. 3, by moving the attached shift lever. The toothed inner circumference 38 of the shifter collar 36 will move away from the drive collar 50 and will traverse back across the blocking ring 42. The second member 14 and the attached drive collar 50 will then be free to rotate at a different rate than the first member 12 depending on the output load and intervening forces. As soon as the shifter collar 36 passes clear of the blocking ring 42, the frictional bond between the conical surfaces 44 and 70 will be broken since there is no longer any appreciable torque forces acting on them. At this time, the blocking ring 42 will rotate with the body member 16 through the connection of the abutments 48 positioned in the notches 22 and the cone element 68 will again rotate at the speed of the drive collar 50. Simultaneously, the rollers 100 will roll to the bottom of the recesses 78 and 92 to permit axial separation and disengagement of the cone element 68 from the frictional surface 73, of the pressure plate 84 from the frictional liner 108, of the frictional liner 110 from the separator plate 112, and of the left side 59 of the second member 14 from the shoulder 60. The rollers 100 will be urged to the bottom of the recesses 78 and 92 by the force of the biasing springs 81 connected across the cone element 68 and the pressure plate 84. If the optional springs 120 are present between the pair of blocking rings 42 and 42', they will assist in moving the blocking ring 42 to the right thereby aiding in breaking the frictional bond between the two conical surfaces 44 and 70. This completes the separation process and the first and second members 12 and 14 are free to rotate independent of each other.

It should be mentioned that both synchronization and the disengagement of synchronization occur within a fraction of a second and the axial movement between the various parts is very minimal, for example only a fraction of a millimeter.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications and variations which fall within the spirit and scope of the appended claims.

We claim:

1. In a self-energized synchronizer for synchronizing first and second members rotatable about a common axis, said synchronizer including: a body member fixed to said first member for rotation therewith having a toothed outer circumference, a shifter collar having a toothed inner surface engaging said toothed outer circumference of said body member and movable axially thereon, a blocking ring positioned adjacent to said body member and movable axially thereto having a toothed outer surface, a friction surface, and abutment means for limiting relative rotation between said body member and said blocking ring, a drive collar secured to said second member for rotation therewith having a toothed outer surface, the improvement comprising:
   (a) self-energized means rotatable with said drive collar and frictionally engageable by said friction surface of said blocking ring for transferring frictional torque between said first and second members and responsive to such torque transfer to expand; and
   (b) a frictional member carried on said body member and acting between said drive collar and said self-energized means for resisting relative rotation between said first and second rotatable members upon expansion of said self-energized means.

2. The self-energized synchronizer of claim 1 wherein said frictional member is a frictional disk.

3. The self-energized synchronizer of claim 1 wherein said friction surface is on a conical inner surface of said blocking ring and said self-energized means includes a cone element having a conical outer surface engageable with said conical inner surface of said blocking ring, a pressure plate positioned between said drive collar and said cone element with both said cone element and said pressure plate having a plurality of corresponding recesses formed in oppositely aligned surfaces, and a plurality of rollers positioned between each pair of said corresponding recesses for axially separating said cone element and said pressure plate upon relative rotation therebetween.

4. The self-energized synchronizer of claim 3 wherein said cone element has a first side surface frictionally engageable with a side portion of said body member.

5. In a self-energized synchronizer for synchronizing first and second members rotatable about a common axis, said synchronizer including a body member fixed to said first member for rotation therewith and having a toothed outer circumference, a shifter collar having a toothed inner surface engaging said toothed outer circumference of said body member and movable axially thereon, a blocking ring positioned adjacent to said body member and movable axially relative thereto, said blocking ring having a toothed outer surface, a conical inner surface, and abutment means for limiting relative rotation between said body member and said blocking ring, a drive collar secured to said second member for rotation therewith having a toothed outer surface, the improvement comprising:

(a) a cone element having a conical outer surface engageable with said conical inner surface of said blocking ring; and having a plurality of ramped recesses in a side surface thereof opposite from said body member;

(b) a pressure plate positioned between said drive collar and said cone element including engagement means for causing said pressure plate to rotate with said drive collar, said pressure plate having a plurality of ramped recesses corresponding to the recesses in said cone element formed in a side surface facing said side surface of said cone element;

(c) a plurality of rollers partially positioned between each pair of said corresponding recesses for axially separating said cone element and said pressure plate upon relative rotation therebetween;

(d) a separator plate positioned between said drive collar and said pressure plate which is fixed for rotation with said cone element; and (e) a frictional member carried by said body member and positioned between said pressure plate and said separator plate for frictional engagement therewith, whereby, upon frictional engagement of said blocking ring with said cone element caused by axial movement therebetween, said rollers react to differences in rotation between said cone element and said pressure plate to force said pressure plate toward said drive collar and provide frictional contact between both said pressure plate and said frictional member and said frictional member and said separator plate.

6. The self-energized synchronizer of claim 5 wherein said frictional member is a clutch disk which is splined to said body member.

7. The self-energized synchronizer of claim 5 wherein said engagement means is a tab member.

8. The self-energized synchronizer of claim 5 wherein said separator plate has at least one notch in its outer circumference for permitting said engagement means formed on said pressure plate to pass and contact said drive collar.

9. The self-energized synchronizer of claim 5 wherein a biasing means is attached between said cone element and said pressure plate to yieldably urge said cone element and pressure plate toward each other.

10. The self-energized synchronizer of claim 5 wherein a third member is coaxially aligned with said first member and is positioned adjacent to said body member opposite to said second member and a blocking ring, a cone element, a pressure plate, a frictional member, a separator plate, a drive collar secured to said third rotatable member, and a plurality of roller means positioned in each pair of corresponding recesses formed in adjacent side surfaces of said cone element and said pressure plate are all present in a similar fashion as on the other side of said body member to permit synchronization between said first and third members.

11. The self-energized synchronizer of claim 10 wherein springs are attached between said two blocking rings for resisting axially separation therebetween.

12. In a self-energized synchronizer for bringing first and second rotatable members of a transmission into synchronization, said synchronizer including a body member coaxially secured to said first rotatable member having a toothed outer circumference with a plurality of equally spaced notches formed therein and aligned parallel to the central axis of said first rotatable member, a plurality of detent mechanisms positioned on and aligned perpendicular to said toothed outer circumference of said body member, said detent mechanisms movable parallel to the central axis of said body member and perpendicular thereto, a shifter collar having a toothed inner surface engaging said toothed outer circumference of said body member and movable axially thereon, a blocking ring positioned adjacent to said body member and movable axially thereto, said blocking ring having a toothed outer circumference, a conical inner frictional surface, and abutment members located between said inner and outer surfaces which contact said body member for limiting relative rotational movement therebetween, a drive collar fixed to said second member having a toothed outer circumference, the improvement comprising:

(a) a cone element positioned adjacent to said body member and movable axially therewith, said cone element having a conical outer surface frictionally engageable with said conical inner surface of said blocking ring, a first side surface frictionally engageable with a side portion of said body member, and a second side surface containing a plurality of equally spaced recesses;

(b) a pressure plate positioned between said cone element and said drive collar and movable axially therebetween, said pressure plate having a first side surface containing a plurality of equally spaced recesses aligned opposite said recesses in said cone element, and a second side surface containing at least one tab member which cooperates with said drive collar for causing said pressure plate to rotate therewith;

(c) a plurality of rollers positioned in the space formed by said corresponding recesses for causing axially separation between said cone element and said pressure plate upon relative rotation therebetween;

(d) a separator plate positioned between said drive collar and said pressure plate for feeding torque back into said cone element; and (e) a frictional disk carried by said body member and engageable with a surface of said separator plate and with said second surface of said pressure plate, whereby, upon frictional engagement of said blocking ring with said cone element caused by axial movement therebetween, said rollers reacting to differences in rotation between said cone element and said pressure plate to force said pressure plate toward said drive collar and provide frictional contact between both said pressure plate and said frictional disk and between said frictional disk and said separator plate.

13. The self-energized synchronizer of claim 12 wherein said conical surface on said cone element is inclined approximately five to ten degrees.

14. The self-energized synchronizer of claim 13 wherein said conical surface on said cone element is inclined approximately 6.5 degrees.

15. The self-energized synchronizer of claim 12 wherein each of said recesses in said cone element and said pressure plate contains oppositely aligned inclined sides.

16. The self-energized synchronizer of claim 15 wherein said inclined sides are angled from about 10 degrees to 45 degrees when measured from said second side surface on said cone element and from said first side surface on said pressure plate.

17. The self-energized synchronizer of claim 16 wherein said inclined sides are angled from about 20-40 degrees.

18. The self-energized synchronizer of claim 17 wherein said inclined sides are angled about 35 degrees.

19. The self-energized synchronizer of claim 12 wherein each of said rollers is a ball.

20. The self-energized synchronizer of claim 19 wherein the diameter of each ball is greater than twice the depth of any recess formed in said cone element or in said pressure plate.

21. In a self-energized synchronizer for bringing first and second or first and third rotary members of a stepped-ratio transmission into synchronization, said synchronizer including an annular body member fixed to said first member for rotation therewith having a toothed outer circumference including a plurality of equally spaced notches formed thereon which are aligned parallel to the central axis of said first member, a plurality of detent mechanisms equally spaced about the circumference of said body member including a guide, a spring and a plunger which are movable parallel to the central axis of said body member, an annular shifter collar having a toothed inner surface engaging said toothed outer circumference of said body member and movable axially thereon, an annular blocking ring positioned on each side of said body member and movable axially thereto, each of said blocking rings having a toothed outer surface, a conical inner frictional surface and abutment members located between said inner and outer surfaces engageable in said notches of said body member to radially limit relative rotational movement therebetween, a spring member extending through bores formed in said body member and in both of said blocking rings, said spring having ends attached to a side surface of said blocking rings for maintaining said blocking rings relative to said body member, an annular drive collar positioned to the side of each of said blocking rings remote from said body member and secured to said second and third members, respectively, for rotation therewith, each of said drive collars having a toothed outer surface engageable with said toothed inner surface of said shifter collar when said shifter collar is axially moved across said respective blocking ring and onto said respective drive collar; the improvement comprising:

(a) a cone element positioned between each of said drive collars and said body member and movable axially therebetween, each of said cone elements having a conical outer surface frictionally engageable with said conical inner surface of said respective blocking ring upon relative axial movement of said blocking ring away from said body member, a first side surface frictionally engageable with a side portion of said body member, and a second side surface containing a plurality of equally spaced recesses;

(b) an annular pressure plate positioned between each cone element and said respective drive collar and movable axially therebetween, each pressure plate having a first side surface containing a plurality of equally spaced recesses aligned opposite said recesses in said adjacent cone element, and a second side surface containing at least one tab member which cooperates with said respective drive collar for causing said pressure plate to rotate therewith;

(c) a plurality of rollers positioned in the space formed by said corresponding pairs of recesses for axially separating said cone element and said respective pressure plate upon relative rotation therebetween;

(d) an annular separator plate positioned between each of said pressure plates and said respective drive collar for feeding torque back into said cone element; and (e) an annular frictional disk carried by said body member and positioned between each corresponding pair of said pressure plates and said separator plates, each frictional disk having frictional surfaces engageable with a surface of said respective separator plate and with said second surface of said respective pressure plate upon frictional engagement of said inner and outer conical surfaces of said blocking ring and cone element, respectively, caused by axial movement therebetween, said rollers reacting to differences in rotation between said cone element and said respective pressure plate to force said pressure plate toward said adjacent drive collar to provide frictional contact between said cone element and said body member, between said pressure plate and said frictional disk, and between said frictional disk and said separator plate, such frictional contact causing simultaneous rotation between said first and second or said first and third rotary members thereby allowing said shifter collar to be axially moved over one of said respective blocking rings and into clash-free engagement with said teeth on said respective drive collar.

* * * * *

UNITED STATES PATENT AND TRADEMARK OFFICE
CERTIFICATE OF CORRECTION

PATENT NO. : 4,413,715

DATED : 8 November 1983

INVENTOR(S) : Richard A. Michael, Dalsang K. Chaudhari and Gordon L. Marquart

It is certified that error appears in the above-identified patent and that said Letters Patent is hereby corrected as shown below:

Column 1, line 33, delete "M. J. Maina" and insert -- R. J. Wojcikowski --; line 34, delete "R. J. Wojcikowski" and insert -- M. J. Maina --.

Signed and Sealed this

Sixteenth Day of April 1985

[SEAL]

Attest:

DONALD J. QUIGG

*Attesting Officer*     *Acting Commissioner of Patents and Trademarks*